United States Patent
Tortoriello et al.

(10) Patent No.: US 11,386,468 B2
(45) Date of Patent: Jul. 12, 2022

(54) DIALOGUE MONITORING AND COMMUNICATIONS SYSTEM USING ARTIFICIAL INTELLIGENCE (AI) BASED ANALYTICS

(71) Applicant: ACCENTURE GLOBAL SOLUTIONS LIMITED, Dublin (IE)

(72) Inventors: Felice Tortoriello, Milan (IT); Paolo Canaletti, Milan (IT)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 607 days.

(21) Appl. No.: 16/279,743

(22) Filed: Feb. 19, 2019

(65) Prior Publication Data

US 2020/0265483 A1 Aug. 20, 2020

(51) Int. Cl.
*G06Q 20/36* (2012.01)
*G06Q 30/02* (2012.01)
*G06Q 10/06* (2012.01)
*G10L 15/26* (2006.01)
*H04M 3/51* (2006.01)

(52) U.S. Cl.
CPC ... *G06Q 30/0281* (2013.01); *G06Q 10/06393* (2013.01); *G10L 15/26* (2013.01); *H04M 3/5175* (2013.01)

(58) Field of Classification Search
CPC .......... G06Q 30/0281; G06Q 30/0282; G06Q 10/06393; G10L 15/26; H04M 3/5175; H04M 3/5183; H04M 3/5191
See application file for complete search history.

(56) References Cited

U.S. PATENT DOCUMENTS

| | | | |
|---|---|---|---|
| 2008/0189171 A1* | 8/2008 | Wasserblat | G06Q 10/06398 705/7.32 |
| 2013/0024373 A1* | 1/2013 | Choudhuri | G06Q 30/018 705/42 |
| 2017/0236131 A1 | 8/2017 | Nathenson et al. | |
| 2017/0316438 A1 | 11/2017 | Konig et al. | |
| 2019/0026786 A1* | 1/2019 | Khoury | G06Q 30/0271 |

FOREIGN PATENT DOCUMENTS

| | | |
|---|---|---|
| JP | 2015-225591 A | 12/2015 |
| JP | 6435426 B1 | 12/2018 |

* cited by examiner

*Primary Examiner* — Rasha S Al Aubaidi
(74) *Attorney, Agent, or Firm* — Mannava & Kang, P.C.

(57) ABSTRACT

A system for providing dialogue monitoring and communications is disclosed. The system may comprise a data access interface, a processor, and an output interface. The data access interface may receive data associated with a customer-initiated event from a data source. The processor may identify a category type and a stage associated with the customer-initiated event. The processor may also calculate a metric using an artificial intelligence (AI) based technique. The processor may also generate a recommendation based on the calculated metric, wherein the recommendation, which when acted upon, improves a customer journey and experience. The output interface may transmit, to a user device, at least one of the customer-initiated event, the category type, the stage, the metric, and the recommendation in a dashboard.

19 Claims, 7 Drawing Sheets

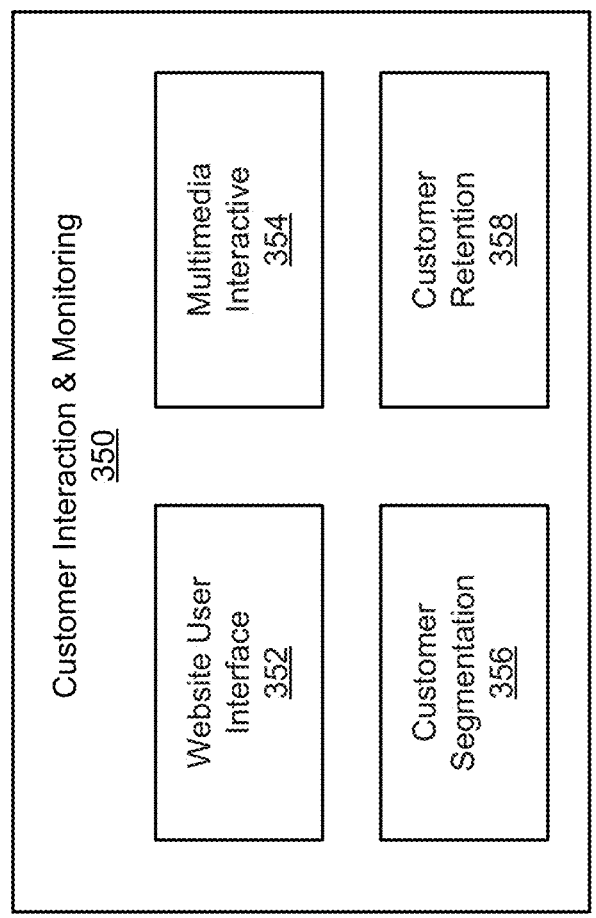

| Channel | Event | Dialogue Step | Dialogue Type |
|---|---|---|---|
| WEB | Navigation page 3 | Start | Maintenance |
| CC/RETAIL | Creation SR Nov 4 | Intermediate | Maintenance |
| WEB | Click 1 | Intermediate | Maintenance |
| APP | Navigation page 4 | Intermediate | Maintenance |
| APP | Navigation page 5 | Closure | Maintenance |
| CC/RETAIL | Accept offer n | Closure | Maintenance |
| WEB | Research | Start | Sales |
| APP | Click 1 | Intermediate | Sales |
| APP | Click n | Intermediate | Sales |
| APP | Navigation page n | Intermediate | Sales |
| APP | Accept offer n | Closure | Sales |
| WEB | Does not accept offer n | Closure | Sales |
| WEB | Accept offer n | Closure | Sales |

Maintenance Dialogue 410

Sales Dialogue 420

Dialogues Details (Updated in Batch and Real Time) 400C

| Event Time | Event | Channel | User | Dialogue Type | Dialogue Event Type |
|---|---|---|---|---|---|
| d1 | Navigation page 1 | APP | User A | | |
| d1 | Navigation page 2 | WEB | User A | | |
| d1 | Navigation page 3 | WEB | User A | Maintenance | Start |
| d1 | Creation SR type 2 | CC/RETAIL | User A | Maintenance | Intermediate |
| d1 | Creation SR type 1 | WEB | User A | | |
| d2 | Login | WEB | User A | | |
| d2 | Click 1 | WEB | User A | Maintenance | Intermediate |
| d2 | Click 4 | WEB | User A | | |
| d2 | Click 5 | APP | User A | Sales | Start |
| d2 | Click n | CC/RETAIL | User A | Sales | Intermediate |
| d2 | Creation SR type 3 | WEB | User A | | |
| d3 | Navigation page 4 | APP | User A | Maintenance | Intermediate |
| d3 | Navigation page 5 | APP | User A | Maintenance | End |

Dialogue AR (Updated in Batch and Real Time)

| Date | User | Dialogue Type | Status | #Interactions | Started Date | Closed Date |
|---|---|---|---|---|---|---|
| d1 | User A | Maintenance | Closed | 5 | d1 | d3 |
| d2 | User A | Sales | Ongoing | 2 | d2 | |

FIG. 4C

DIALOGUE MONITORING AND COMMUNICATIONS SYSTEM USING ARTIFICIAL INTELLIGENCE (AI) BASED ANALYTICS

TECHNICAL FIELD

This patent application relates generally to data and communications monitoring and management, and more specifically, to systems and methods for dialogue and communications monitoring using artificial intelligence (AI) and analytics-based monitoring and machine learning.

BACKGROUND

Advances in mobile telecommunications are changing the way people communicate with one another and the way people buy things. The retail industry, for example, has witnessed unprecedented digital growth in recent years. Also, with increased globalization, large volumes of data and digital transactions are taking place at a rapid rate. As a result, managing customer satisfaction is becoming more and more challenging in the digital age.

A customer journey may involve numerous interactions a company, like a retailer, has with its customer. For instance, when a customer purchases a product or service from a merchant, this particular transaction is merely the tip of the iceberg in what is essentially a "journey" created by all the moments leading up to and following that purchase. A retailer can offer great products or services, build a stellar website, provide speedy delivery, and even have a dedicated customer service team, but any weak link in this very long chain could send a current or potential customer elsewhere.

Although traditional models have sought to enhance the customer journey in a variety of ways, a technical problem with most traditional approaches is the focus on collecting large amounts of data while providing only limited analytics. Even though the collection of data is important and presents its own unique challenges, conventional systems fail to offer any meaningful way for a merchant to "think" more like a customer. Additionally, traditional solutions fail to provide retailers or merchants insight on how to more seamlessly map out the various touchpoints of a customer journey to maximize customer experience.

As a result, a more robust approach and solution may be needed to collect and monitor customer dialogues in order to better identify customer touchpoints before, during, and after a transaction, and creating "smarter" ways to improve the overall customer journey and experience using artificial intelligence (AI) and analytics-based monitoring and machine learning.

BRIEF DESCRIPTION OF DRAWINGS

Features of the present disclosure are illustrated by way of example and not limited in the following Figure(s), in which like numerals indicate like elements, in which:

FIG. 3 illustrates a block diagram of a customer interaction and monitoring subsystem, according to an example;

FIG. 4A illustrates a screen of dialogues in a dialogue monitoring and communications system, according to an example;

FIG. 4C illustrates a screen for dialogue monitoring and communications, according to an example.

DETAILED DESCRIPTION

Figure 1:
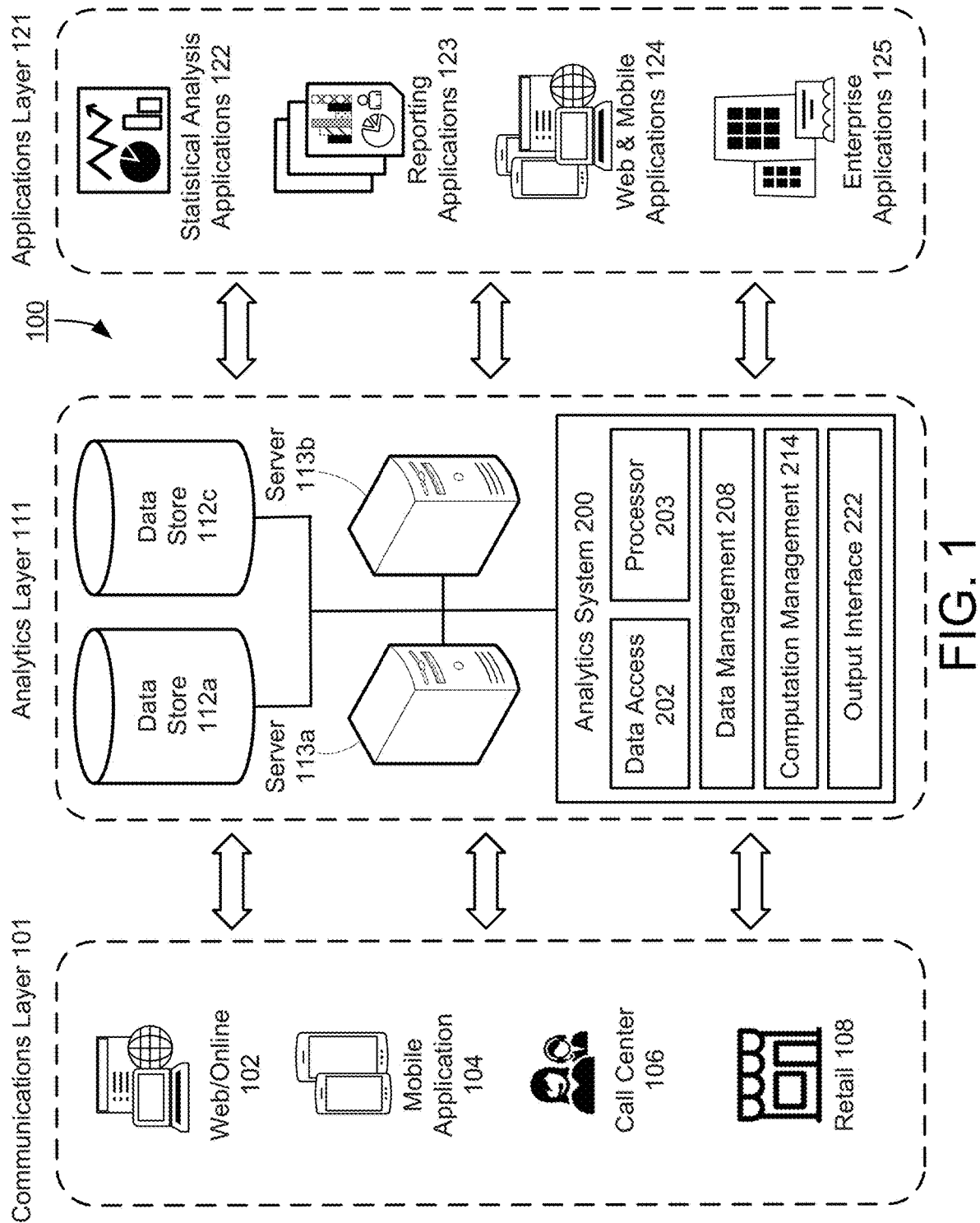
FIG. 1 illustrates a dialogue monitoring and communications system using artificial intelligence (AI) and analytics-based machine learning, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As discussed above, a customer journey may involve numerous interactions a company, like a retailer or merchant, has with its customers. Even if a retailer can offer great products or services, build a stellar website, provide speedy delivery, and have a dedicated customer service team, any weak link in this very long chain could send a current or potential customer elsewhere.

In order to optimize a customer journey, it may be important for a merchant to recognize and take advantage of all available customer touchpoints and channels. As described herein, a touchpoint may refer to any time, place, or way a potential customer or returning customer interacts with a business before, during, or after the customer purchases a good or service. A channel, as described herein, may describe in more detail a medium of interaction between a customer and a business, such as through a mobile application or a customer service representative at a call center.

Traditional models that seek to enhance the customer journey have focused largely on collecting large amounts of data while providing only limited analytics and have not given retailers or merchants ability to leverage all potentially available touchpoints and channels. Even though the customer data collected from a multitude of sources is important, such conventional systems ultimately fail to offer any meaningful way to "think" like a customer or any way to more seamlessly map out the various touchpoints and channels of a customer journey in order to maximize customer experience.

As described herein, a dialogue monitoring and communications system using artificial intelligence (AI) and analytics-based machine learning may provide a more robust approach and solution. The dialogue monitoring and communications system described herein may collect and monitor customer dialogues and better identify customer touchpoints before, during, and after a transaction. For example, the dialogue monitoring and communications system may better track customer interactions across all channels and dimensions. This may enable more focus on pattern identification for process optimization. Also, the dialogue monitoring and communications system, as described herein, may help identify customer groups based on omnichannel behaviors, which may further enable a merchant to shape and design a more dedicated and personalized dynamic experience for each identified customer group. The dialogue monitoring and communications system may also execute various customer experience strategies through real-time or near real-time personalization driven by customer-centric actions.

Among other things, the dialogue monitoring and communications system may increase overall conversation quality through customer journey analysis, and may create "smarter" ways to enhance the overall customer experience. This may be achieved by identifying effective channel strategies. For example, the dialogue monitoring and communications system may be used to in a variety of ways to shape and develop customer dialogues, provide more engagement, create up/cross-selling and retention approaches, etc. Additionally, the dialogue monitoring and communications system, as described herein, may help design and perform differentiated omnichannel strategies (online or offline), which may be based on various customer segments in order to maximize customer experience and channel efficiency. These and other advantages may be apparent using the dialogue monitoring and communications system described herein.

It should be appreciated that a traditional customer touchpoint and/or customer channel may be multiplied by a large number of other touchpoints before a purchase, such as social media, aggregators, marketing, indirect partner channels, third party review sites, market research, 3rd party industry regulators, word of mouth, etc. Other customer touchpoints may be found during a purchase. These may include brand website, various promotions, customer service teams, online interactive agents, point-of-sale (POS) systems, etc. Post-purchase customer touchpoints may include online forums or message boards, social medial, a billing department, post-purchase communications, loyalty or membership programs, which may include marketing, listservs, newsletters, renewals, etc. Other various customer touchpoint may also be provided and contemplated.

FIG. 1 illustrates a dialogue monitoring and communications system using artificial intelligence (AI) and analytics-based machine learning, according to an example. The dialogue monitoring and communications system 100 may be used to monitor and analyze data. In particular, the dialogue monitoring and communications system 100 may receive data from a communications layer 101 or from other sources and provide dialogue monitoring and communications using artificial intelligence (AI) and analytics-based machine learning at an analytics system 200.

The dialogue monitoring and communications system 100 may operate in a network or an enterprise environment where data is exchanged. More specifically, the dialogue monitoring and communications system 100 may provide real-time or near real-time monitoring and analysis of various communications channels between a customer or prospective customer and a merchant. In this way, the dialogue monitoring and communications system 100 may identify various touchpoints, map them, and use AI-based machine learning to deliver a combination of real-time marketing capabilities that leverage predictive and adaptive analytics, decision-making, and business process management to enable dynamic multi-channel conversations through an entire customer journey or lifecycle.

The dialogue monitoring and communications system 100 may include a communications layer 101, an analytics layer 111, and an applications layer 121. The communications layer 101 may include systems, subsystems, applications, and/or interfaces to collect information from various customer-facing sources. These may include, but not limited to, web/online 102, mobile application 104, call center 106, and retail system 108 (e.g., brick and mortar store location), all of which may be distinct or integrated with the dialogue monitoring and communications system 100. The communications layer 101 may include other data or information sources as well. It should be appreciated that each of these data sources may further include its own data feed, storage, system, application, or other source for collecting and sending data and information, including third party or indirect sources.

The web/online 102 may include a variety of traditional or digital channels, such as enterprise resource planning (ERP) systems and applications, documents, web feeds or online portals. In some examples, the ERP system may include one or more application servers that host various ERP applications. These may include, for example, a customer relationship management (CRM) platform, system, or application. The ERP system may collect, store, manage, and interpret data associated with various enterprise functions or activities. The ERP system may provide an integrated and continuously updated view of core business processes, for example, using common databases maintained by a database management system. The ERP system may also track enterprise resources (e.g., cash, raw materials, production capacity, etc.) as well as other information, such as corporate or business transactions (e.g., orders, purchase orders, payroll, etc.). The ERP system may also monitor and store data associated with various customer communications. Furthermore, the applications that make up the ERP system may share data across various departments (e.g., manufacturing, purchasing, sales, accounting, etc.) that provide related communications data. The ERP system may facilitate information flow between many enterprise functions and may manage communications with stakeholders, customers, or other parties. The ERP system may also contain a large amount of information that could be used to enhance meaning of other data sources.

Documents may provide another source of data. Data received via such documents may include files, emails, faxes, scans, or other documents that are transmitted, received, and stored in an enterprise environment, especially to and from customers or other related entities. In some examples, this may also include an owner's manual and return policies for products or systems or other documentation or communicated information. It may also include receipts, records of transactions, purchases, returns, exchanges, etc.

Web feeds may be yet another source of data. Data received via web feeds may include data from various web sources, such as social media, syndication, aggregators, or from scraping. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing. Web feeds may also include data from forums, message boards, online reviewers, third party sites, or other available online material.

Mobile application 104 may include Internet-based or mobile device based systems or applications of various users. A mobile application 104 may have all the capabilities of web/online 102 but may be tailored to systems or applications used by an enterprise or customer on a mobile device, such as a smart phone, tablet, laptop, watch, or other portable computing device.

Call center 106 may be another source of data. For example, call center 106 may include records of various interactions a customer may have with a merchant, via a customer service or sales representative. This may involve interactions before, during, and after a purchase of a good or service. A call center 106 may also provide data regarding billing, returns, exchanges, contract renewals or termination, or other various inquiry between a customer and a merchant.

Retail system 108 may be store location in which a customer may physically interact with a merchant. In some examples, retail system 108 may be a brick and mortar store or other similar physical location, which may provide a host of touchpoints and channels as well. These may include onsite sales and customer service teams, local promotions or events, immersive brand recognition and marketing, point-of-sale (POS), returns, exchanges, invoices, etc.

It should be appreciated that machine and sensor data (not shown) may be another source of data and information. In an Internet of Things (IoT) environment, many systems and products are equipped with numerous sensors or diagnostic equipment that may provide a plethora of machine and sensor data. There may be a number of physical devices, appliances, systems, or products that are equipped with electronics, software, and sensors, where most, if not all, of these items may be connected to a network and share some measure of connectivity with each other. This may enable these and other pieces of equipment to communicate and exchange data. This may also allow various systems, objects, and items to be detected, sensed, or remotely controlled over one or more networks, creating a vast array of management functionalities. These may include abilities to provide data analytics on equipment, assessment of equipment health or performance, improved efficiency, increased accuracy or function, economic benefit, reduction of human error, etc. Together with other technologies and systems, the machine and sensor data may help enable the dialogue monitoring and communications system 100 provide predictive analytics using AI and machine learning.

It should be appreciated that the communications layer 101 may also include geolocation data either as part of the web feeds or machine and sensor data. Geolocation data may include information or data associated with identification or estimation of real-world geographic location of an object, such as a radar source, mobile device, or web-based computer or processing device. Geolocation data may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, Internet Service Provider (ISP), language, proxies, or other information that can be used to piece together and trace location. This and other data in the communications layer 101 may be collected, monitored, and analyzed to provide predictive analytics useful in retail environments. For example, if it is recognized that a customer is approaching an area with a brick and mortar store location, such data may be important for the dialogue monitoring and communications system 100 to use for maximizing customer touchpoints and channels.

It should also be appreciated that the dialogue monitoring and communications system 100 may also provide a gateway (not shown). In an example, the gateway may provide edge computing capabilities and sit on an "edge" of the communications layer 101 or local network, and function as an intermediary before transmitting data to the analytics layer 111. The gateway may perform and run analytics in order to decrease time, expense in data delivery, and perhaps even taking immediate action at equipment to which the sensors are attached. In many ways, the gateway may provide real-time or near real-time analytics at the edge to simplify the analytics process and increase responsiveness and efficiency. The gateway may be physical or virtual element and may be configured for compact or full implementation. When devices and sensors send data to the gateway 107, this data may be initially parsed and, depending on the rules and actions that are configured, some critical and time-saving analytics may be immediately performed right at the gateway itself. This may save time, energy, and costs associated with full transmission of data to the analytics layer 111. It should be noted that the gateway may operate in partial or full capacity, or it may be removed entirely. It should also be appreciated that data analytics and processing techniques described below with respect to the analytics layer 111 may also be performed partially or in full by the gateway.

The analytics layer 111 may collect, manage, process, and analyze information and data from the communications layer 101 and the applications layer 121. The analytics layer 111 may be within general control of an enterprise, such as an organizational entity conducting operations, business, or other related activities. For example, this may be a merchant or retailer that operates one or more factories, fleets of vehicles, chains of stores or restaurants, etc. This may also be an organization that helps manage such operations on behalf of a merchant or retailer. In order to conduct business and/or various customer-facing operations, the analytics layer 111 of the dialogue monitoring and communications system 100 may include one or more data stores, one or more servers, and other elements to process data for its organizational purposes.

For example, the analytics layer 111 may include data stores 112a and 112b. In an example, the data store 112a may be a data management store and may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to monitoring and managing data as a value resource.

In another example, the data store 112b may be an operational data store and may store information and data associated with operational reporting, controls, and decision-making. The operational data store may be designed to integrate data from multiple sources for additional operations on that data, for example, in reporting, controls, and operational decision support. Integration of data at the operational data store may involve cleaning, resolving redundancy, checking against business rules, and other data integration techniques, such as data virtualization, federation, and extract, transform, and load (ETL). The operational data store may also be a source of data for an additional data stores in the dialogue monitoring and communications system 100.

The analytics layer 111 may also include other data stores, such as an enterprise data store (not shown), which may be used for tactical and strategic decision support. For example, an enterprise data store may store information and data associated with reporting and data analysis, and may be instrumental to various business intelligence functions. The enterprise data store may be one or more repositories of integrated data (e.g., from the operational data store 112b) and used to store current and historical data and to create analytical report(s) for advanced enterprise knowledge. Data passed through the enterprise data store may also involve cleansing to ensure data quality and usage. ETL may also be used, as well as other techniques, involving staging, data integration, and access features. Ultimately, data in the enterprise data store may be transformed and catalogued so that it may be used for data mining, analytics, and other business intelligence purposes, such as marketing, customer retention, touchpoint and channel optimization, decision support, etc. Other data stores may also be provided in the analytics layer 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the dialogue monitoring and communications system 100 and/or run one or more application that utilize data from the dialogue monitoring and communications system 100. Other various server components or configurations may also be provided.

The analytics layer 111 may further include a variety of servers 113a and 113b that facilitate, coordinate, and manage information and data. For example, the servers 113a and 113b may include any number or combination of the following servers: exchange servers, content management server, application servers, database servers, directory servers, web servers, security servers, enterprise servers, and analytics servers. Other servers to provide data monitoring and communications may also be provided.

The analytics layer 111 may also include an analytics system 200. The analytics system 200 may include various layers, processors, systems or subsystems. For example, the analytics system 200 may include a data access interface 202, a processor 203, a data management subsystem 208, a computation management subsystem 214, and an output interface 222. Other layers, processing components, systems or subsystems, or analytics components may also be provided.

There may be several examples of hardware that may be used for the servers, layers, subsystems, and components of the analytics system 200 or the dialogue monitoring and communications system 100. For example, the processor 203 and/or computation management subsystem 214 may comprise an integrated circuit, and may execute software or firmware or comprise custom processing circuits, such as an application-specific integrated circuit (ASIC) or field-programmable gate array (FPGA). The data access interface 202 and output interface 222 may be any number of hardware, network, or software interfaces that serves to facilitate communication and exchange of data between any number of or combination of equipment, protocol layers, or applications. For example, the data access interface 202 and output interface 222 may each include a network interface to communicate with other servers, devices, components or network elements via a network in the dialogue monitoring and communications system 100. More detail of the analytics system 200 is provided in FIG. 2.

The dialogue monitoring and communications system 100 may also include an applications layer 121. The applications layer 121 may include any number or combination of systems and applications that interface with users or user-interfacing tools in an enterprise or customer-facing environment. For example, the applications layer 121 may include statistical analysis applications 122, reporting applications 123, web and mobile applications 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, Stata®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the analytics layer 111. Again, the application layer 121 may also provide a source of valuable information for the analytics system 200 to help optimize customer touchpoints and channels.

It should be appreciated that a layer, as described herein, may include a platform and at least one application. An application may include software comprised of machine-readable instructions stored on a non-transitory computer readable medium and executable by a processor. The systems, subsystems, and layers shown in FIG. 1 may include one or more servers or computing devices. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

It should be appreciated that a single server is shown for each of the gateway, servers 113a and 113b, and/or other servers within the systems, layers, and subsystems of the dialogue monitoring and communications system 100. However, it should be appreciated that multiple servers may be used for each of these servers, and the servers may be connected via one or more networks. Also, middleware (not shown) may be included in the dialogue monitoring and communications system 100 as well. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the dialogue monitoring and communications system 100.

Within the dialogue monitoring and communications system 100, there may be a large amount of data that is exchanged, and the exchanged data may contain data related to customer dialogues, inquiries, or other information associated with products, goods, or services of an organization, as well as other data outside of enterprise control. Many of the conventional techniques to use or process the data, however, are limited. They typically do not adequately or reliably provide solutions to complex questions, especially as they pertain to customer journey or experience. In fact, traditional models that focus on data collection rather and provide only little analytics have not given retailers or merchants, for example, capabilities to "think" more like a customer and therefore maximize all available touchpoints and channels to optimize customer journey and experience. The dialogue monitoring and communications system 100, described herein, may solve these and other technical problems by leveraging AI-based analytics and machine learning.

Figure 2:
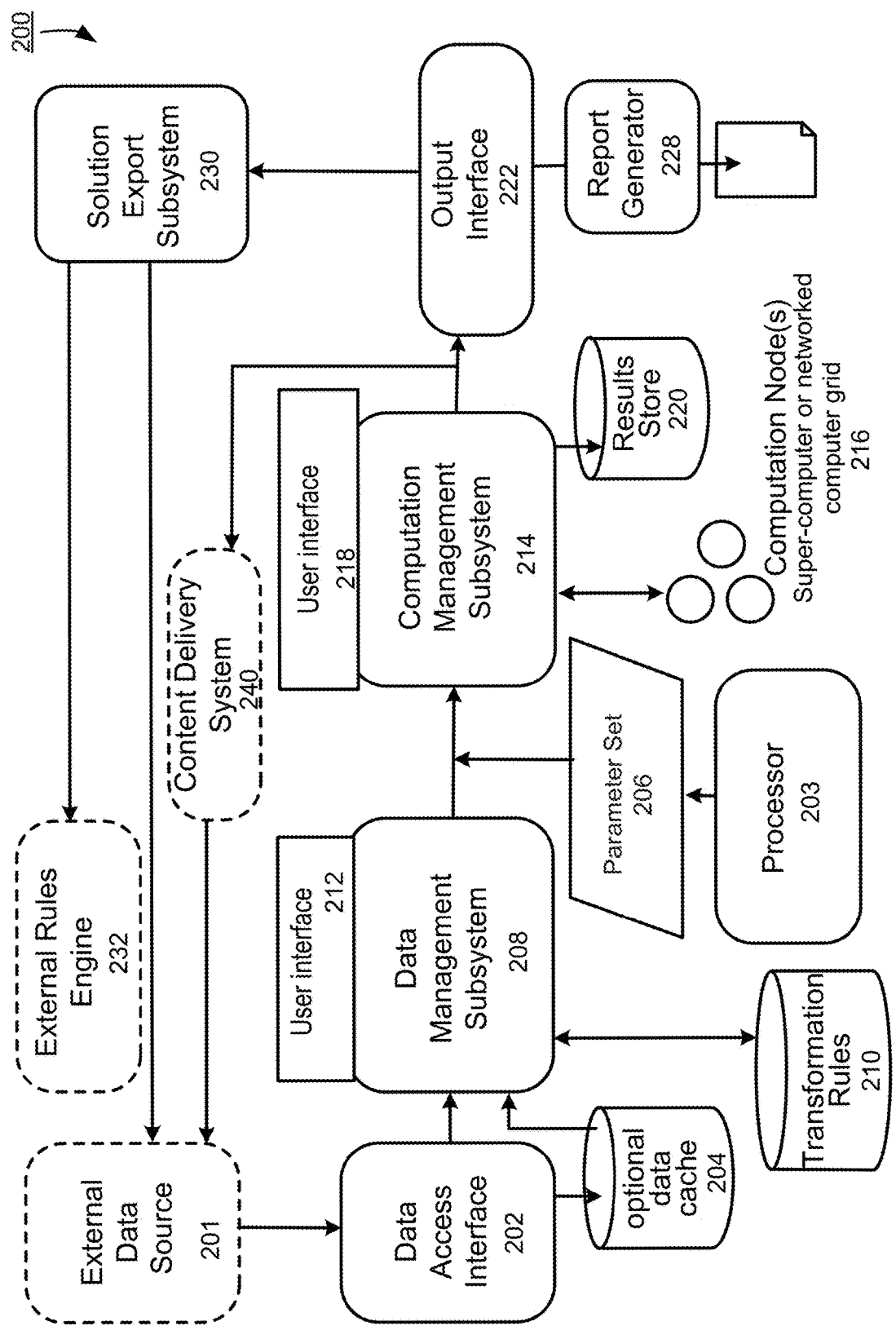
FIG. 2 shows an analytics system for dialogue monitoring and communications, according to an example.

FIG. 2 shows an analytics system 200 for dialogue monitoring and communications, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may provide AI-based analytics and machine learning to dialogue monitoring and communications. In an example, the analytics system 200 may be an integrated system as part of the analytics layer 111 shown in FIG. 1.

In the example of FIG. 2, data may be accessed from and/or provided from an external data source 201 by a data access interface 202. The external data source 201 may be any data source from the communications layer 101, analytics layer 111, and applications layer 121 of the dialogue monitoring and communications system 100 of FIG. 1, as well as other data sources not depicted. The data access interface 202 may optionally store some or all (or none) of the data in an optional data cache 204, which may be local or remote. It should be appreciated that data acquired for dialogue monitoring and communications may involve open semantic databases, more reputable sources of web content, open crawl databases, or other similar source.

The imported data may then be passed to a data management subsystem 208 for processing prior to performing analytics. For example, data collected at the communications layer 101 may be in various formats. Thus, the data management subsystem 208 may organize the data by grouping, ordering, transforming, or cleaning the data in such a way that facilitates input of the data into analytics processing. It should be appreciated that the data management subsystem 208 may perform these features alone or in conjunction with other components of the analytics layer 111, such as the servers 113a and 113b. The data management subsystem 208 may use one or more transformation rules that specify one or more rules to apply to the data for processing. In an example, the transformation rules may be accessed from storage (e.g., from data store 210). Additionally or alternatively, the transformation rules may be input by a user. For example, the data management subsystem 208 may provide a user interface 212 that enables the user to specify one or more transformation rules. The data management subsystem 208 may also implement data management without rules (e.g., non-rule-based) and rely on other data management schemes.

The data management subsystem 208 may identify different types of variables that are specified by the user, and separate the variables according to the identified type. Some types of variables may be used as inputs to the analytics process, while other types of variables may be used evaluation criteria to evaluate the resulting analytics solutions. As such, the system may enable not only automated processing of data, but also automated evaluation of the resulting analytics solutions.

The variables determined by the data management subsystem 208 and a parameter set 206 generated by the processor 203 may be provided to the computation management subsystem 214. The computation management subsystem 214 may send the processed data including the parameter set 206 and one or more chosen algorithms to one or more computational nodes 216 to perform computational operations. The computation management subsystem 214 may generate knowledge graphs, perform clustering operations, execute classification, and/or perform other analytics or machine-learning actions, including modeling, simulation, training, or other similar techniques.

Classification may provide assignment of instances to pre-defined classes to decide whether there are matches or correlations. Clustering may use groupings of related data points without labels. A knowledge graph may provide an organized graph that ties nodes and edges, where a node may be related to semantic concepts, such as persons, objects, entities, events, etc., and an edge may be defined by relations between nodes based on semantics. It should be appreciated that, as described herein, the term "node" may be used interchangeably with "entity," and "edge" with "relation."

Once imported data is transformed by the data management subsystem 208 and variables determined, the computation management subsystem 214 may apply a heuristic approach, such as a text parsing or processing based on regular expressions, including natural language processing (NLP) techniques. For audio, machine translation may be used to convert audio to natural language text. For images or videos, metadata may be used for basic heuristic processing. In another example, the computation management subsystem 214 may apply deep learning techniques that may pull in various classification, clustering, knowledge graph based, and/or metrics-based approaches. These approaches may be self-driven or may be supervised. In some examples, supervised learning algorithms may utilize target driver variables specified by the user to facilitate searching for particular solutions, among the potentially many solutions generated by the computation nodes 216, that are meaningful to the user. The computation management subsystem 214 may also provide a user interface 218 that shows the user the progress of knowledge graph generation.

An output interface 222 may also be provided. The output interface 222 may output the generated knowledge graph. Accordingly, the output interface 222 may also include a visualization interface. A report generator 228 may generate report. In some implementations, the visualization interface may also provide a variety of evaluation results, for example, to a solution export subsystem 230. The solution export subsystem 230 may provide feedback information to the analytics system 200 or other systems in the dialogue monitoring and communications system 100. For example, the solution export subsystem 230 may provide feedback information to an external rules engine 232 (or other feedback component), which may, for instance, use the feedback information to adapt one or more transformation rules. Additionally or alternatively, the solution export subsystem 230 may feedback information to the external data source 201, for instance, to adjust one or more variables or attributes in the data. In this way, the analytics system may be fine-tuned to provide improved and more accurate calculations and computations.

For example, the solution export subsystem 230 may be configured to export information regarding customer dialogues to different types of external databases and external systems. In some implementations, the solution export subsystem 230 may be configured to export one or more rules or algorithms. The rules or algorithms may enable external systems to apply those rules or algorithms to implement the customer dialogues or communications to various types of data stored on the external database. In some implementations, the system may obtain data from the external system, retune its "understanding" based on the received data (such as changing variable selection or other changes), and send information regarding what it "learned" to the external system. As such, in some implementations, the analytics system 200 may enable more than just an analytics tool, but also enable a feedback-based and connected enterprise system.

It should be appreciated that once the output interface 222 provides the customer dialogues and communications (and related actions taken in response or "new" information learned from such communications and actions), the report generator 228 may generate a report to be output to a user, such as a security manager or other user. The report may include various types of information, such various predictions or calculations, and may enable a user to adjust one or more variables of the analytics system 200 to fine-tune operations, as described herein.

By providing an AI-based and machine learning analytics technique as described herein, the analytics system 200 may enable the user to monitor numerous customer dialogues simultaneously in real-time or near real-time and provide a focused analysis of ways to identify to maximize customer touchpoints and channels. For example, the analytics system may focus on pattern identification across all channels and dimensions, identify customer groups based on consistent sets of customer behaviors, design and shape dynamic experience for each customer group, and propose and execute personalized strategies for customer-centric actions. In this way, the analytics system 200 may incorporate a whole host of customer dialogue information, in a heterogeneous manner, that results in a more efficient and more intuitive way of monitoring customer dialogues and performing predictive analytics. It should be appreciated that examples described herein may have a flexible structure and offer many advantages over other forms of analytics.

FIG. 3 illustrates a block diagram of a customer interaction and monitoring subsystem 350, according to an example. In an example, the customer interaction and monitoring subsystem 350 may be part of the analytics system of the dialogue monitoring and communications system 100, and may highlight core functionalities. For example, the customer interaction and monitoring subsystem 350 may include a website user interface 352, a multimedia interactive 354, a customer segmentation platform 356, and a customer retention platform 358.

The website user interface 352 may also be described as a "digital cockpit," where in the dialogue monitoring and communications system 100, a user may be able to monitor customer dialogues and various interactions the customer has with a merchant via multiple communications channels. Furthermore, the website user interface 352 may provide access to a host of controls, configurations, reporting, access, etc. For example, the user may provide a multitude of inputs and receive a multitude of outputs from the dialogue monitoring and communications system 100. In some examples, the website user interface 352 may be accessed by the user over any user device or application that has access to a network that is capable of communicating with the dialogue monitoring and communications system 100. In some examples, the website user interface 352 may also provide various reporting, analytics, and visualizations based on AI-based analytics of the analytics system 200 of the dialogue monitoring and communications system 100.

The multimedia interactive 354 may provide a visual interactive interface. In some examples, the visual interactive interface may track a journey of a customer from a first communication channel to a second communication channel, and so forth (e.g., to an $n^{th}$ communication channel, where "n" may represent an integer). In other words, a user using the multimedia interactive 354 may access customer journey information from a customer-centric perspective over a multitude of customer channels.

The customer segmentation platform 356 may be a subsystem or application that associates a particular customer with a pre-defined customer segment. The customer retention platform 358 may determine strategies or actions, based on AI-based machine learning techniques, to help retain a customer. In some examples, the customer retention platform 358 may also be used to generate strategies or actions to help obtain new or prospective customers, develop marketing strategies for customers, or other strategies or actions to help improve customer journey and experience, as described herein.

FIG. 4A illustrates a screen 400A of dialogues in a dialogue monitoring and communications system, according to an example. As shown, the screen 400A may illustrate an ad hoc table. This ad hoc table may be assembled based on identification of customer dialogues that are ongoing for each customer and associating this information with various customer channels, events (e.g., customer action), dialogue type (e.g., maintenance, sales, etc.), and dialogue step. In other words, the ad hoc table may associate a customer action to a particular dialogue type and related dialogue step.

In an example, as shown in the top entry row of the table, a customer (e.g., the same customer) may have interacted with a retailer via the "web" channel and performed an action on "navigation page 3." Here, the table may associate these customer actions with the "start" of a dialogue and identify this as a "maintenance" type of dialogue. In the next row, for example, a customer may have interacted with a retailer in a traditional or offline manner, e.g., via a "call center (CC) or retail" channel. The customer, via the customer representative at the call center or retail store, may have performed an action identified as "creation SR type 4," which may correspond to an "intermediate" dialogue step that is also in the "maintenance" category. In the last row of the table shown in screen 400A, a customer may have interacted with a retailer at a touchpoint via a "web" channel. Here, the customer may have "accepted offer n." This may correspond with a "closure" of the dialogue step. In other words, it may signify the end of that particular customer journey and no further action may be needed at that particular time in the "sales" dialogue type.

It should be appreciated that there may be many more channels, events, dialogue steps, and dialogue types beyond what is shown. There may also be more categories that may be associated with these groupings. It should be appreciated that the ad hoc table may also be configured to be displayed in any way or layout that facilitates use or access of information and associations. For instance, in screen 400A, maintenance dialogue 410 may be shown at the top of the table and sales dialogue 420 may be shown at the bottom. This may enable greater ease of use or access to data and associations. Other various configurations and customizations may also be provided.

Figure 4B:
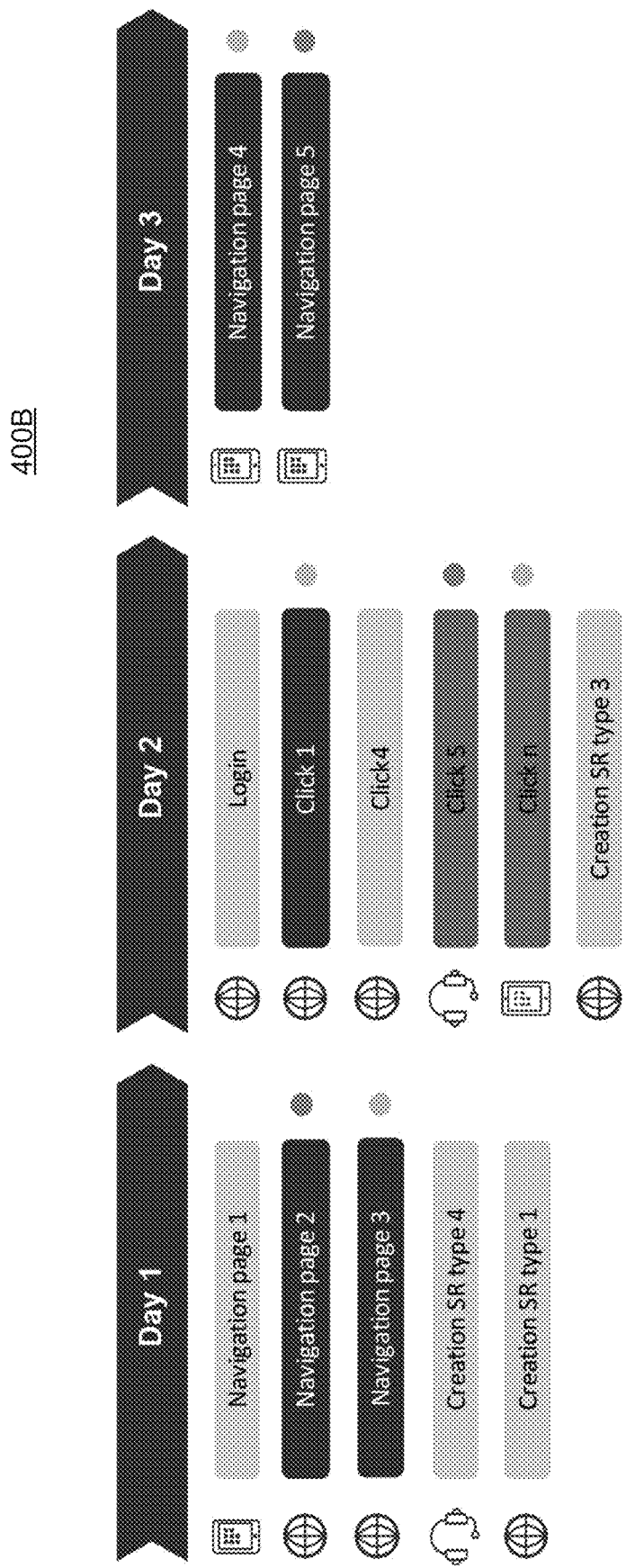
FIG. 4B illustrates a data flow 400B of customer actions or events in a dialogue monitoring and communications system, according to an example.

For example, FIG. 4B illustrates a data flow 400B of customer actions or events in a dialogue monitoring and communications system 100. As shown, FIG. 4B may depict the customer actions (or events) performed by a customer, via digital and traditional channels, in chronological order over three days (e.g., categorized by Day 1, Day 2, and Day 3). Here, the "channel" may be depicted with a specific representative icon. For instance, an icon of a phone or tablet may indicate a mobile app channel, an icon of a globe may indicate a web channel, and an icon of a headset may indicate a call center or customer representative at a physical store.

The various customer actions or events may be shown day by day, and may be color-coded for ease of viewing and identification. For example, the color-coding may also be used to indicate and associate the customer action or event with a particular dialogue type. For example, a solid dark color may indicate a "maintenance" dialogue type, a solid medium color may indicate a "sales" dialogue type, and a light-colored cross-hatch pattern may indicate "no dialogue." Other variations may also be provided.

Additionally or alternatively, an indicator may be placed by certain customer actions or events to show dialogue step. For instance, a dot indicator of various colors, patterns, shapes, or sizes may be used to identify the various dialogue step. In an example, one color may indicate "start," another color may indicate "intermediate," and another color may indicate "end" of the dialogue.

All of these functions and features may enable a user, when previewing the data flow 400B, to quickly identify various customer touchpoints and channels that may need his or her attention. It should be appreciated that customer events tracking may be provided in real-time or near real-time. It should also be appreciated that the not all events may be part of a dialogue. It should also be appreciated that these customer events and various associations may be pre-defined. That said, it should also be appreciated that new events and associations may also be created by the analytics system 200 of the dialogue monitoring and communications system 100 using AI-based analytics and machine learning, as described herein. Other various examples and implementations may also be provided.

FIG. 4C illustrates a screen 400C for dialogue monitoring and communications, according to an example. As shown, the screen 400C may depict a dialogue analytic record, which may include a detailed analysis of customer dialogues. For example, customer events may be tracked in a "Dialogue Details" table, which may be updated in batch and real-time, or near real-time. It should be appreciated that only details of events configured as part of a dialogue have information on dialogue type and dialogue event type. This table may enable a user to preview customer journey in a more granular fashion.

Dialogue main information may be stored and shown in a "Dialogue Analytics Record (AR)" table, which may also be updated in batch and real-time, or near real-time. This may enable a user to preview customer journey in a general manner, and further inspect in detail as needed.

The dialogue monitoring and communications system 100 may use AI-based analytics and machine learning to provide additional functionality. For example, the dialogue monitoring and communications system 100 may apply analytics to provide omnichannel journey and intent logic. In other words, the dialogue monitoring and communications system 100 may leverage machine learning capabilities and techniques to analyze any "customer dialogue." In this way, the dialogue monitoring and communications system 100 understand customer behavior and patterns and makes sense of the various ordered actions and interactions across various channels, and use this knowledge to potentially steer a customer to a business relevant behavior and identify dialogues the customer may have with a customer.

In an example, this may occur when events from digital and traditional channels are collected. For instance, event information from home page access, login, cart modification, word research, personal page access, catalogue page access, service requests, etc. may be gathered. Key performance indicators (KPIs) may be created using this gathered information and used in various machine learning applications. For example, machine learning techniques that involve pattern mining, logistic regression, decision tree, random forest, or other models, simulations, or techniques may help analyze customer behavior on channels and identify relevant patterns that lead to specific dialogue identification.

In some examples, the dialogue monitoring and communications system 100 may also provide model verification. In other words, dialogue monitoring and communications system 100 may determine which machine learning technique works best in what situations and apply only those that are helpful to obtain the desired outcome.

Using this information, the dialogue monitoring and communications system 100 may determine frequent and dominant patterns of one or more customer journeys. Ultimately, this information may then be used and leveraged to satisfy one or more business need of the retailer or merchant. For example, the dialogue monitoring and communications system 100 may be used to predict customer pain points, which may allow a merchant or retailer to be more proactive in addressing these issues before they become more serious. Understanding customer behaviors and trending patterns may also help discern and refine offerings through the various digital or traditional touchpoints and/or channels, ultimately to enhance and improve overall customer experience.

Figure 5:
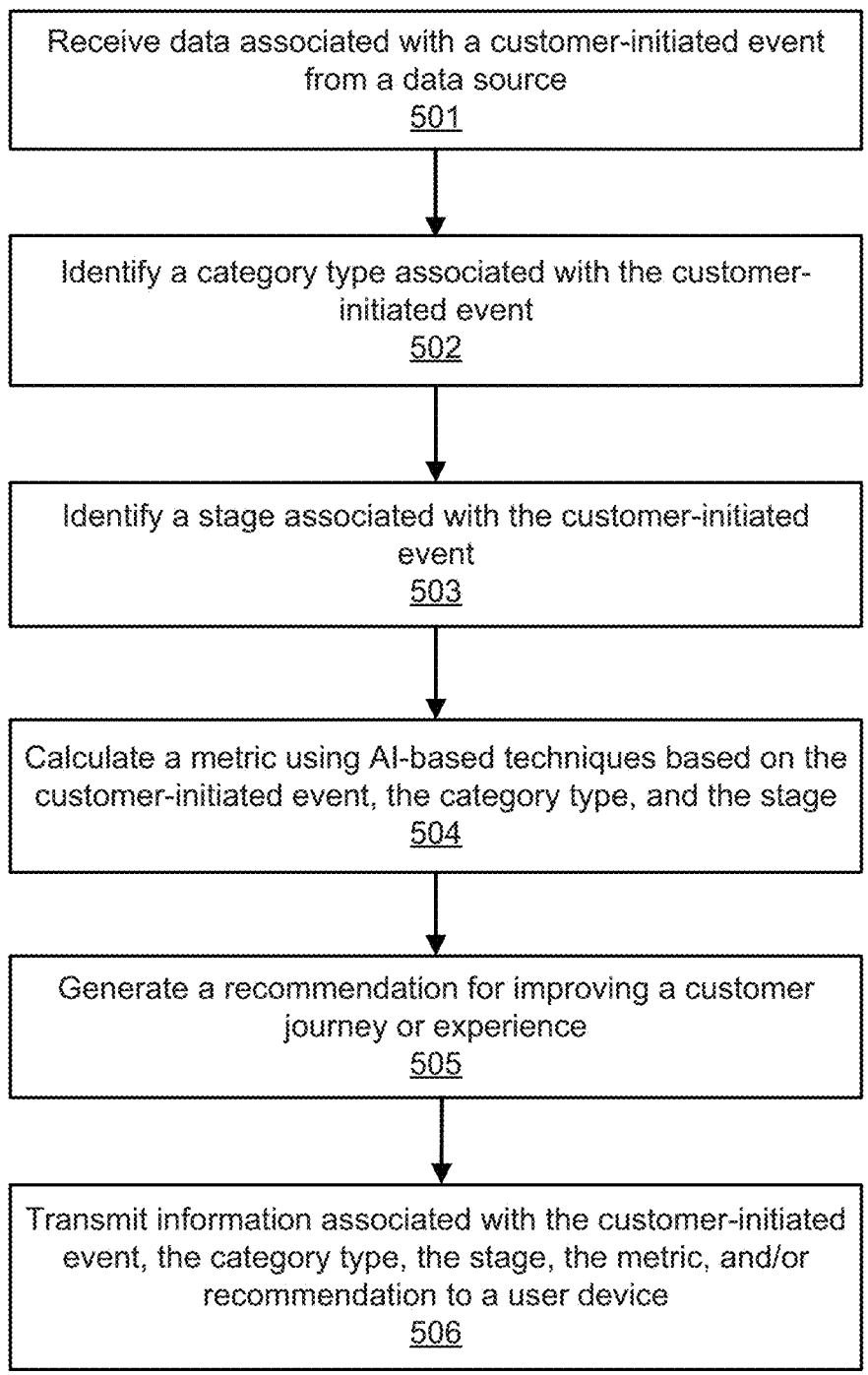
FIG. 5 illustrates a method for dialogue monitoring and communications, according to an example.

FIG. 5 illustrates a method for dialogue monitoring and communications, according to an example. The method 500 is provided by way of example, as there may be a variety of ways to carry out the method described herein. Although the method 500 is primarily described as being performed by systems 100, 200, and/or 350 as shown in FIGS. 1, 2 and/or 3, respectively, the method 500 may be executed or otherwise performed by other systems, or a combination of systems. Each block shown in FIG. 5 may further represent one or more processes, methods, or subroutines, and one or more of the blocks may include machine-readable instructions stored on a non-transitory computer readable medium and executed by a processor or other type of processing circuit to perform one or more operations described herein.

At block 501, the data access interface 202 may receive data associated with a customer-initiated event from a data source. In some examples, the customer-initiated event may include viewing a merchant webpage, clicking a link on a merchant webpage, interacting with a mobile application, interacting with a customer representative, posting on social media associated with a merchant, and/or responding to merchant marketing. Other various customer-initiated events may also be provided. As described above, the data source may include the web/online source 102, the mobile application 104, the call center 106, and/or the retail system 108. Other various data sources may also be provided.

At block 502, the processor 203 may identify a category type associated with the customer-initiated event. As described herein, the category type associated with the customer-initiated event may include sales, maintenance, or other category type. At block 503, the processor 203 may identify a stage associated with the customer-initiated event. As described herein, the stage associated with the customer-initiated event may include start, intermediate, closure, or other type of stage or step.

At block 504, the processor 203 may calculate a metric using artificial intelligence (AI) based techniques based on the customer-initiated event, the identified category type, and the identified stage. In some examples, the metric may include key performance indicators (KPIs) associated with the customer-initiated event. In some examples, the metric may include determining a frequent customer behavior, a customer trend or pattern, a customer journey pain point prediction, and a new customer touchpoint or channel. Other various metrics may also be provided. As described above, the AI-based technique may include any number of techniques, such as clustering, classification, pattern mining, logistic regression, decision tree, random forest, semantics, knowledge graph analysis, or combination thereof. Other various techniques may also be provided.

At block 505, the processor 203 may generate a recommendation based on the calculated metric, wherein the recommendation, which when acted upon, improves a customer journey and experience. In some examples, recommendation may include any number of strategies, such as those directed to customer retention, marketing, management, branding, customer service, service renewal, and adjacent goods or services.

At block 506, the output interface 222 may transmit, to a user device, at least one of the customer-initiated event, the category type, the identified stage, the metric, and the recommendation in a dashboard. In some examples, the dashboard may be a multimedia interactive dashboard. It should be appreciated that the analytics system 200 may also include a configuration interface to receive configuration data. The analytics system 200 may also associate a user-defined category to an event based on the configuration data, and associate a user-defined stage to an event based on the configuration data. Other various examples may also be provided.

Although applications of AI-based analytics and machine learning using are directed mainly to dialogue monitoring and communications, it should be appreciated that that the dialogue monitoring and communications system 100 may also use these AI-based machine learning techniques in other various environments, such as in semantic searches, data management, fraud detection, competitive marketing, dynamic risk analysis, content-based recommendation engines, and other types of knowledge or data-driven management systems. The dialogue monitoring and communications system 100 may also use other various techniques, such as classification algorithms, clustering schemes, simulation models, decision trees, or use of knowledge graphs, to form a more comprehensive and flexible approach to dialogue monitoring and communications.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system for providing dialogue monitoring and communications, comprising:
   one or more data stores to store and manage data within a network;
   one or more servers to facilitate operations using information from the one or more data stores;
   an analytics system that communicates with the one or more servers and the one or more data stores to provide dialogue monitoring and communications in the network, the analytics system comprising:
     a data access interface to:
       receive data associated with a customer-initiated event from a data source wherein the customer initiated event pertains to a transaction;
     a processor to:
       identify a category type associated with the customer-initiated event;
       track the transaction through multiple stages that are indicative of a progress of the transaction,
         wherein the multiple stages include at least a start stage, an intermediate stage, and a closure stage that indicates an end for the transaction;
       identify a current stage associated with the customer-initiated event wherein the current stage for the customer initiated event is identified as one of the multiple stages; and
       calculate a metric using an artificial intelligence (AI) based technique based on the customer-initiated event, the identified category type, and the current stage;
       generate a recommendation regarding a next step to be executed based on the current stage identified for the transaction and the metric, wherein the recommendation, which when acted upon, improves a customer journey and experience; and
     an output interface to transmit, to a user device, at least one of the customer-initiated event, the category type, the current stage, the metric, and the recommendation in a dashboard.

2. The system of claim 1, wherein the customer-initiated event comprises at least one of viewing a merchant webpage, clicking a link on a merchant webpage, interacting with a mobile application, interacting with a customer representative, posting on social media associated with a merchant, and responding to merchant marketing.

3. The system of claim 1, wherein the data source comprises at least one of a web or online source, a mobile device or application, a call center, and a retail system.

4. The system of claim 1, wherein the category type associated with the customer-initiated event comprises at least one of sales and maintenance.

5. The system of claim 1, wherein the metric comprises at least one of key performance indicators (KPIs) associated with the customer-initiated event, a frequent customer behavior, a customer trend or pattern, a customer journey pain point prediction, and a new customer touchpoint or channel.

6. The system of claim 1, wherein the AI-based technique comprises at least one of clustering, classification, pattern mining, logistic regression, decision tree, random forest, semantics, and knowledge graph analysis.

7. The system of claim 1, wherein the recommendation comprises a strategy for at least one of customer retention, marketing, management, branding, customer service, service renewal, and adjacent goods or services.

8. The system of claim 1, wherein the dashboard is part of the user device to deliver multimedia data to a user.

9. The system of claim 1, wherein the analytics system comprises a configuration interface to:
 receive configuration data;
 associate a user-defined category to an event based on the configuration data; and
 associate a user-defined stage to an event based on the configuration data.

10. The system of claim 1, wherein the processor is to further:
 enable a display of a dataflow that shows details regarding the transaction,
  wherein the details include an icon indicative of a channel via which the customer-initiated event was received, a color coding indicative of the category type associated with the customer-initiated event, and an indicator that conveys the current stage associated with the customer-initiated event.

11. A non-transitory computer-readable storage medium having an executable stored thereon, which when executed causes a processor to provide:
 a website user interface to:
  receive data associated with a customer-initiated event from a data source wherein the customer initiated event pertains to a transaction, wherein:
   the customer-initiated event comprises at least one of viewing a merchant webpage, clicking a link on a merchant webpage, interacting with a mobile application, interacting with a customer representative, posting on social media associated with a merchant, and responding to merchant marketing; and
   the data source comprises at least one of a web or online source, a mobile device or application, a call center, and a retail system;
 a visual interactive interface to:
  track a journey of a customer from a first communication channel to a second communication channel from a customer-centric perspective; and
  display a multimedia dashboard for user interaction;
 a customer segmentation subsystem to:
  identify a category type associated with the customer-initiated event;
  track the transaction through multiple stages that are indicative of a progress of the transaction,
   wherein the multiple stages include at least a start stage, an intermediate stage, and a closure stage that indicates an end for the transaction;
  identify a current stage associated with the customer-initiated event wherein the current stage for the customer initiated event is identified as one of the multiple stages characterizing the transaction; and
  calculate a metric using an artificial intelligence (AI) based technique based on the customer-initiated event, the identified category type, and the identified stage; and
 a customer retention subsystem to:
  generate a recommendation regarding a next step to be executed based on the metric and the current stage identified for the transaction, wherein the recommendation, which when acted upon, improves a customer journey and experience.

12. A method for providing dialogue monitoring and communications, comprising:
 receiving, at a processor in communication with one or more data stores and one or more servers of a network, data associated with a customer-initiated event from a data source wherein the customer initiated event pertains to a transaction;
 identifying a category type associated with the customer-initiated event;
 tracking the transaction through multiple stages that are indicative of a progress of the transaction,
  wherein the multiple stages include at least a start stage, an intermediate stage, and a closure stage that indicates an end for the transaction;
 identifying a current stage associated with the customer-initiated event wherein the current stage for the customer initiated event is identified as one of the multiple stages characterizing the transaction;
 calculating a metric using an artificial intelligence (AI) based technique based on the customer-initiated event, the identified category type, and the identified stage;
 generating a recommendation regarding a next step to be executed based on the metric and the current stage, wherein the recommendation, which when acted upon, improves a customer journey and experience; and
 transmitting, to a user device, at least one of the customer-initiated event, the category type, the current stage, the metric, and the recommendation in a dashboard.

13. The method of claim 12, wherein the customer-initiated event comprises at least one of viewing a merchant webpage, clicking a link on a merchant webpage, interacting with a mobile application, interacting with a customer representative, posting on social media associated with a merchant, and responding to merchant marketing.

14. The method of claim 12, wherein the data source comprises at least one of a web or online source, a mobile device or application, a call center, and a retail system.

15. The method of claim 12, wherein the category type associated with the customer-initiated event comprises at least one of sales and maintenance.

16. The method of claim 12, wherein the metric comprises at least one of key performance indicators (KPIs) associated with the customer-initiated event, a frequent customer behavior, a customer trend or pattern, a customer journey pain point prediction, and a new customer touchpoint or channel.

17. The method of claim 12, wherein the AI-based technique comprises at least one of clustering, classification, pattern mining, logistic regression, decision tree, random forest, semantics, and knowledge graph analysis.

18. The method of claim 12, wherein the recommendation comprises a strategy for at least one of customer retention, marketing, management, branding, customer service, service renewal, and adjacent goods or services.

19. The method of claim 12, wherein the dashboard is part of the user device to deliver multimedia data to a user.

* * * * *